United States Patent
McNulty et al.

(10) Patent No.: US 7,364,226 B2
(45) Date of Patent: Apr. 29, 2008

(54) STRUCTURAL ASSEMBLY HAVING INTEGRATED OUTER AND INNER REINFORCED MEMBERS

(75) Inventors: Frank G. McNulty, Rochester Hills, MI (US); Edward Engler, Farmington Hills, MI (US)

(73) Assignee: Noble Advanced Technologies, Warren, MI (US)

( * ) Notice: Subject to any disclaimer, the term of this patent is extended or adjusted under 35 U.S.C. 154(b) by 289 days.

(21) Appl. No.: 11/210,721

(22) Filed: Aug. 24, 2005

(65) Prior Publication Data

US 2006/0043774 A1 Mar. 2, 2006

Related U.S. Application Data

(60) Provisional application No. 60/604,367, filed on Aug. 25, 2004.

(51) Int. Cl.
*B62D 25/20* (2006.01)
(52) U.S. Cl. .......................................... 296/209; 296/30
(58) Field of Classification Search .............. 296/209, 296/187.12, 203.03, 205, 29, 30
See application file for complete search history.

(56) References Cited

U.S. PATENT DOCUMENTS

| | | | | |
|---|---|---|---|---|
| 4,493,506 | A | 1/1985 | Alexander | 296/209 |
| 5,443,297 | A | 8/1995 | Tanaka et al. | 296/203 |
| 5,938,275 | A | 8/1999 | Kleinhans et al. | 296/203.03 |
| 6,171,542 | B1 | 1/2001 | Struble | 264/543 |
| 6,357,822 | B1 | 3/2002 | Panoz et al. | 296/209 |
| 6,854,795 | B2 | 2/2005 | Yamazaki et al. | 296/209 |
| 6,869,135 | B2 | 3/2005 | Forssell | 296/203.03 |

FOREIGN PATENT DOCUMENTS

| | | |
|---|---|---|
| JP | 05170140 A | 7/1993 |
| JP | 09099859 A | 4/1997 |

*Primary Examiner*—Joseph D Pape
(74) *Attorney, Agent, or Firm*—Gifford, Krass, Sprinkle, Anderson & Citkowski, P.C.

(57) ABSTRACT

A structural assembly, such as for use as a rocker panel in an automotive vehicle and which includes an outer rocker cover and an inner attached and reinforcing member. The reinforcing member is constructed from a continuous steel grade and roll formed material and includes first and second spaced apart wall portions which converge at upper and lower extending ends. An integrally formed web interconnects the inner and outer portions at the lower extending end and exhibits a bulbous shaped configuration defined by an inner radius. Drainage holes are formed through bottommost facing locations of said web, at preselected distances along its length, and in order to evacuate water and paint.

17 Claims, 4 Drawing Sheets

FIG 2 - PRIOR ART

STRUCTURAL ASSEMBLY HAVING INTEGRATED OUTER AND INNER REINFORCED MEMBERS

CROSS REFERENCE TO RELATED APPLICATIONS

The present application claims the priority of U.S. Provisional Patent Application Ser. No. 60/604,367, filed Aug. 25, 2004, and entitled "Rocker Panel Having Integrated Outer and Inner Reinforcement."

BACKGROUND OF THE INVENTION

1. Field of the Invention

The invention relates to rocker panels in use with vehicles. More specifically, the present invention discloses a rocker panel including integrated outer and inner reinforcing components, the configuration of which provides for both improved metal surface quality while decreasing localized strain, as well as drainage of water or paint from a highly corrosive environment.

2. Description of the Related Art

Rocker panel assemblies are well known in the automotive vehicle art. It is further known to provide separate outer and inner reinforcement members to reinforce rocker panels. Typically, the outer and inner reinforcement are individually formed from stamped steel. In assembly, the outer and inner reinforcements are welded together with the rocker panel.

An example of such an arrangement is disclosed in U.S. Pat. No. 4,493,506, issued to Alexander, and which teaches a support structure for a vehicle including first support member positioned below and secured to an underside of the vehicle rocker panel. A portion of the first support member extends laterally outward from the rocker panel and is secured to an exterior vertical portion of the rocker panel. A decorative member is secured to the side of the vehicle and is adapted to overlie a portion of the first support member. A second support member is alternately secured to the interior side of the rocker panel to increase the structural strength of the support structure.

Additional examples drawn from the prior art include U.S. Pat. No. 6,854,795, issued to Yamazaki et al., and which teaches a reinforcement member of an automotive side sill. A V-shaped cross-sectional portion is formed by bending the reinforcement member so as to follow a lower surface of an upper portion of an outer panel. An upper attachment is joined thereto and functions as a resulting bent portion to the upper portion of the outer panel. Finally, a distal end of the upper attaching portion is bent downwardly.

Japanese Publication No. 05170140 teaches a lower structure of an automotive body having a rocker constituted of an inner panel and an outer panel arranged on two side sections in the lateral direction of a vehicle body and a floor pan arranged at the lower section of the vehicle body and connected to the rocker. The floor plan has the first wall section extended upward and fixed to the inner panel and a top section extending upward and fixed to the inner panel. A top section extends outward in the lateral direction from the wall section, and the second wall section is extended downwardly from the top section and fixed to the outer panel at the connection portion to the rocker. A closed cross section shape is formed by a connection portion of the inner panel, outer panel and floor pan.

SUMMARY OF THE INVENTION

The present invention discloses an assembly, such as incorporated into a vehicle rocker panel, and which is easier and less expensive to produce than rocker panel assemblies known in the prior art.

In particular, the assembly includes a three-dimensional shaped and elongate extending outer cover (such as forming a surface component of a rocker panel) and to which is attached, by welding, chemical or mechanical means a reinforcing inner member. The inner member is configured with a lowermost radially extending rope hem (or gap spacing between folded areas of the reinforcing portion), the purpose for which being to improve metal surface quality while decreasing localized strain on the metal surface, this being concurrent with minimizing surface imperfections, i.e., streamers, and associated coating damage. The inner reinforcing member is additionally configured with drainage holes at lowermost extending locations along the rope hem in order to facilitate drainage of fluids, such as paint and water, from a highly corrosive environment.

The outer cover of the rocker panel assembly includes an inner surface against which is fixedly secured, such as again by welding, adhesives, etc., the inner reinforcing member for strengthening the rocker panel assembly. The reinforcing member further includes an inner portion, an outer portion, and an interconnecting web, within which is formed the rope hem and drainage holes. The web is integrally formed with the inner and outer portions of the reinforcing member from such as a sheet of metal in a roll forming process.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE INVENTION

Figure 1:
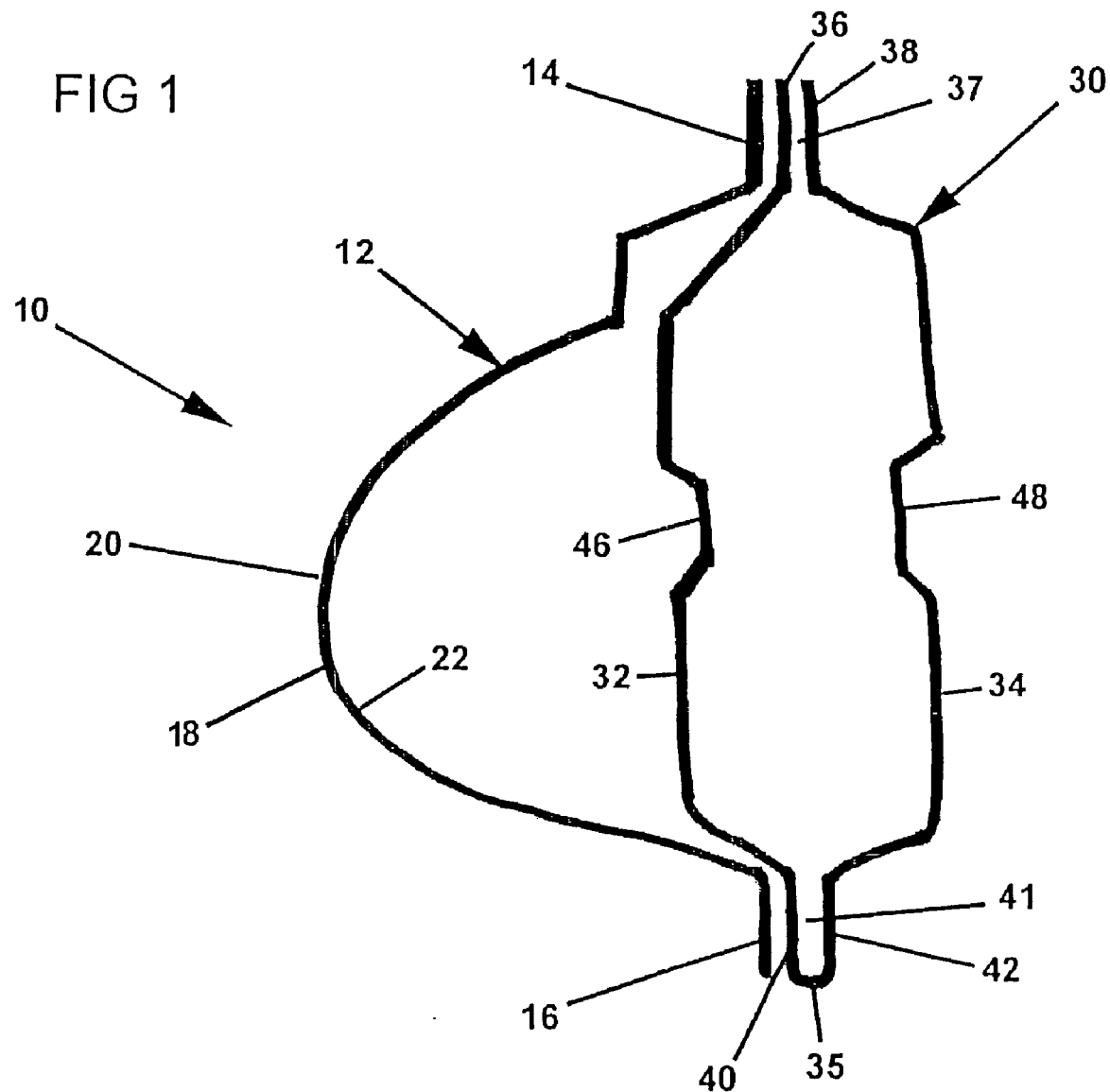
FIG. 1 is a cross-sectional cutaway view of a rocker panel according to a preferred embodiment of the present invention.

Referring to FIG. 1, a reinforced structural panel assembly is illustrated at 10 according to a preferred embodiment of the invention. In a preferred application, the assembly is utilized as a vehicle rocker panel, however it further understood that the assembly is capable of being modified for use in any structural application, not limited to vehicles.

Referring again to FIG. 1, the panel assembly 10 includes an outer and three-dimensional shaped cover 12. In the initial illustrated variant, the cover 12 is conventionally referred to as a rocker panel, it again being understood that the assembly is applicable to both vehicular and non-vehicular applications.

The cover 12 is illustrated in side cutaway in FIG. 1, but is understood to extend in elongated fashion and to include opposite upper 14 and lower 16 ends. A stepped middle section 18 extends between the upper 14 and lower 16 ends. In the embodiment illustrated, the middle section 18 extends arcuately between the upper 14 and lower 16 ends, however it should-be appreciated that the middle section 18 can have any shape in accordance with functional or aesthetic objectives. The arcuate and three-dimensional shaped cover 12 further includes opposite outer 20 and inner 22 facing surfaces along its extending length.

In a preferred variant, the three-dimensional shaped and elongated cover 12 is manufactured from a steel grade sheet metal, formed utilizing any suitable process, such as stamping or roll forming. It is further understood that other and additional material compositions, typically metallic and exhibiting buckling strength in excess of 100 ksi, can be utilized.

As again illustrated in the cutaway side view of FIG. 1, and secured to the three-dimensional shaped cover 12 is a likewise three-dimensional shaped and elongate extending reinforcing member 30. The reinforcing member 30 includes a first wall portion 32, a second spaced apart wall portion 34, and a lowermost and interconnecting web 35.

As with the cover 12, the reinforcing member 30 is typically constructed of a roll formed high strength steel in a closed profile and which is further cut to length or, alternatively, roll formed to achieve a lower strength profile while hardening and subsequently reformed to a final three-dimensional shape.

The wall portions 32 and 34 are generally parallel, each including upper 36, 38 and lower 40, 42 ends, respectively. As is further illustrated, gaps 37 and 41 are defined at the respective upper ends 36, 38 and lower ends 40, 42, and such that the web 35 bridges the gap 41 between lower ends 40, 42 of the first 32 and second 34 wall portions.

A longitudinally extending and recessed portion is integrally formed within each of the first 32 and second 34 spaced apart wall portions, see at 46 and 48, respectively, and may include any of a step, bead or rib for strengthening the reinforcement member 30. As illustrated, the recesses 46, 48 are disposed between the upper 36, 38 and lower 40, 42 ends of the first 32 and second 34 wall portions.

It should further be appreciated that the ribs can be positioned at any suitable position along the first 32 and second 34 wall portions, such as to control buckling of the rocker panel assembly in response to predefined load conditions. It should also be appreciated that the use of ribs, beads, steps and the like provide increased local stiffness, this allowing for the use of a thinner stock material, i.e. resulting in lower cost, as compared to conventional rocker assemblies.

In application, the reinforcing member 30 is disposed along the inner facing surface 22 of the cover 12, such that the upper 36, 38 and lower 40, 42 ends of the reinforcing member 30 are generally aligned with the upper 14 and lower 16 ends of the three-dimensional shaped cover 12, respectively. The upper ends 14, 36, 38 of the members 12 and 30 are fixedly secured to each other by welding.

Similarly, the lower ends 16, 40, 42 of the corresponding members are likewise fixedly secured to each other by welding and in order to achieve a triple wall configuration. It should be appreciated that additional securing options, other than welding, can be utilized to affix the ends together, this further including such as bolts, other mechanical fasteners, adhesives or other chemical applications known in the art.

The lowermost extending web 35 of the reinforcing member 30 is integrally formed by first 32 and second 34 wall portions in a roll forming process, likewise utilizing a single piece of sheet metal. The material composition of the web 35 is selected from a high strength steel to provide reduced weight and lower cost over conventional designs found in the prior art.

Figure 2:
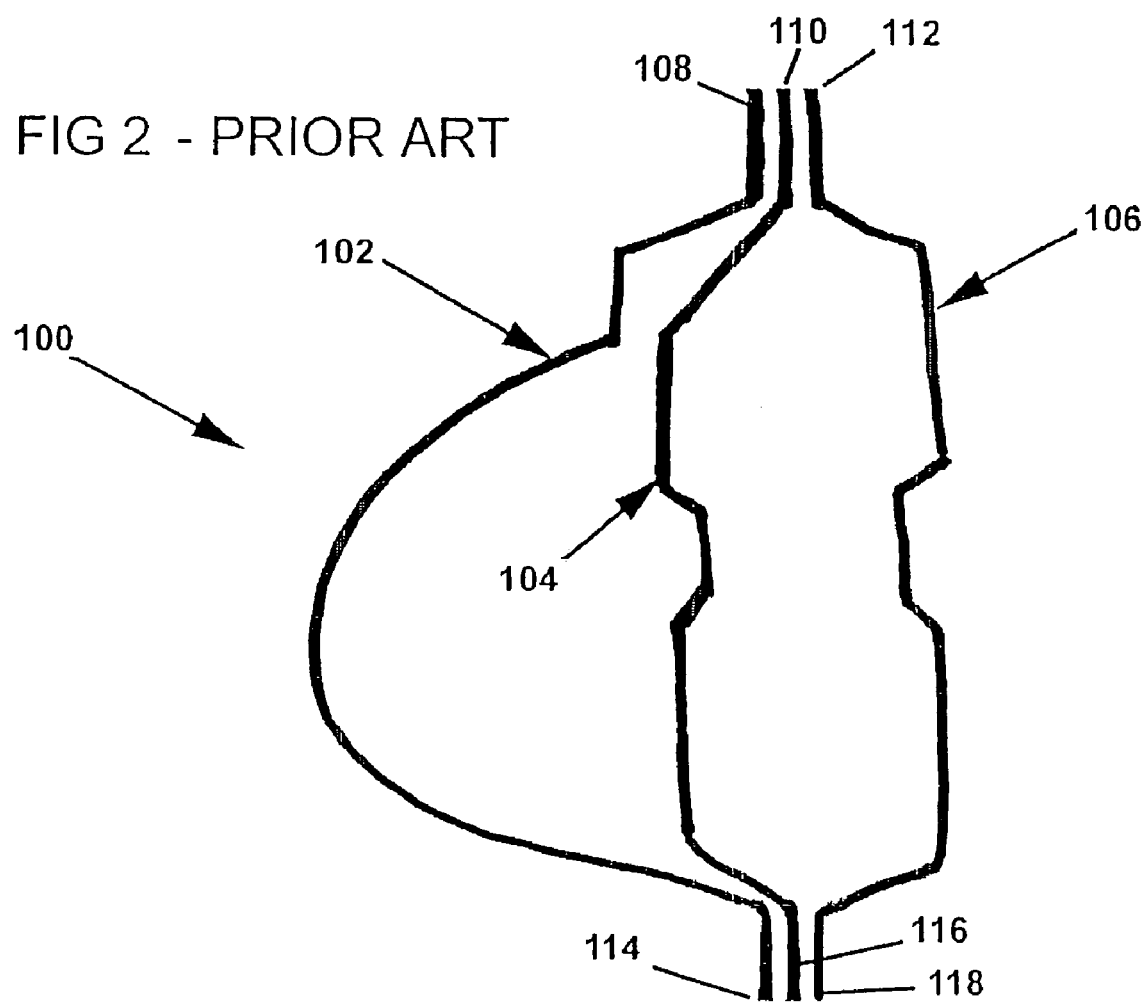
FIG. 2 is a cross-sectional view of a rocker panel from the prior art.

Referring to the prior art illustration of FIG. 2, for example, a conventional rocker panel assembly is generally indicated at 100. The conventional rocker panel assembly 100 includes a rocker panel 102. The conventional rocker panel assembly 100 includes an inner 104 and an outer 106 reinforcement members.

Unlike the reinforcement member 30 (see again FIG. 1) of the present invention, the inner 104 and outer 106 reinforcement members are formed in separate stamping processes using individual sheets of metal. The rocker panel 102, as well as inner 104 and outer 106 reinforcement members, each have upper, see at 108, 110, 112, and lower, see further at 114, 116, 118, ends. The upper ends 108, 110, 112 are fixedly secured to each other by welding. The lower ends 114, 116, 118 are likewise fixedly secured to each other by welding and are not interconnected by a web formed in a roll forming process out of a single sheet of metal.

In contrast, the three-dimensional shaped cover 12 and the reinforcing member 30 of the instant invention are each roll formed from a generally continuous web of high strength steel (such as exhibiting buckling strengths in excess of 100 ksi) and cut to their final desired length. Alternatively, the cover 12 and the reinforcing member 30 are each roll formed from a low strength steel, and hardened and formed to their final three-dimensional shape.

Figure 3:
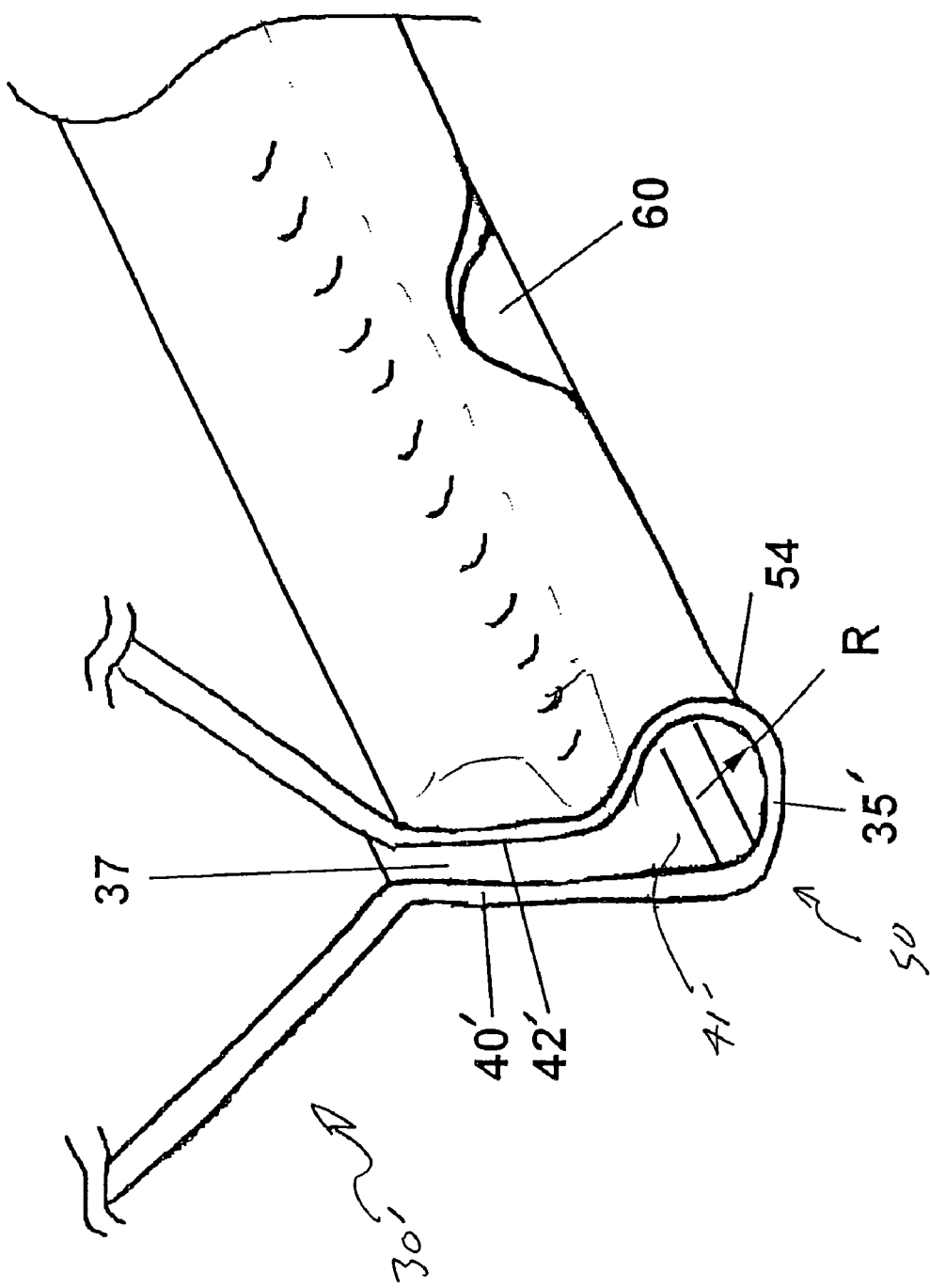
FIG. 3 is a perspective sectional view of a web portion of an inner reinforcing member of the present assembly and illustrating the features of a controlled gap established between inwardly folded portions of the web in cooperation with the bottommost and radially extending rope hem, as well as the provision of the scalloped shaped fluid drainage holes at extending and bottommost disposed locations of the rope hem.

Referring now to FIG. 3, a perspective sectional view of a web portion 35' is illustrated of an alternatively configured inner reinforcing member 30' according to the present assembly, and which in particular illustrates the features of a controlled gap, see at 37, established between inwardly folded portions of the web 35', i.e., lower ends 40' and 42', in cooperation with the forming of a bottommost and radially extending rope hem 50, as defined by bulbous configuration 54 and by indicated radius arrow R.

The roll formed rope hem 50 may be formed at the web 35' in order to create a spring bias that minimizes (or in certain instances completely eliminates) the gap 37 established between the upper ends 36, 38 of the first 32 and second 34 wall portions (see as again shown in corresponding illustration of reinforcing member 30 in FIG. 1) prior to assembly with the three-dimensional and elongated cover member 12. Specifically, reinforcing member 30 may be configured to include a closed section prior to assembly with the cover 12 (i.e., rocker panel).

A portion of at least one of the lower ends 40' and 42' is deformed into a gap 41', thereby defining the radial configuration R and resulting bulbous configuration 54 of the web 35'. Preferably, the radius R (i.e., rope hem) is preselected as a function of the metal thickness of the reinforcement member 30, thereby to minimize high stress regions along the intersection between the web 35 and the lower ends 40, 42 and in order to prevent the formation of streamers or other surface imperfections (i.e., coating damage) which is inherent with prior art reinforcing members.

Control, or elimination, of the gap 37 (again FIG. 3) is determined, again based upon material thickness and strength and to prevent cracking and the formation of surface streamers during shape folding of the continuous layer of roll formed steel forming the inner reinforcing layer.

Any plurality of drain holes 60 may also be provided at any location associated with the lower end 40, 42 of the reinforcing member 30 to allow fluid, such as water or excess paint to be evacuated from the highly corrosive environment existing around the web. The size of the drain holes 60 can vary in size and can be formed before, during or after formation of the reinforcing member 30.

Figure 4:
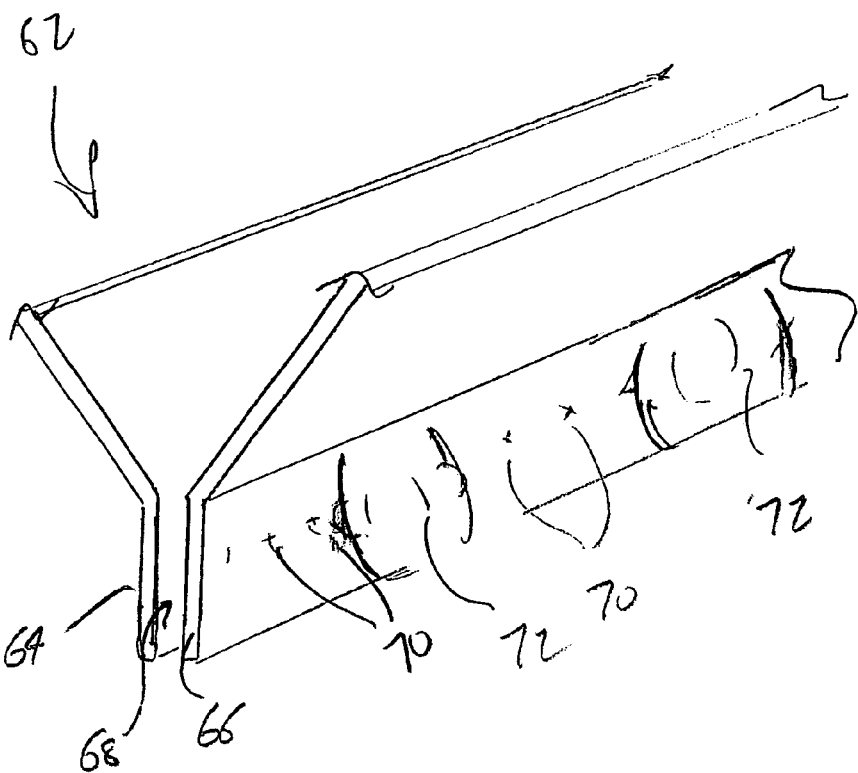
FIG. 4 is a further perspective view of a structural member following sectioned removal of its lowermost portion subsequent to roll forming.

The drain holes are further illustrated with a generally "scalloped" shape in the embodiment illustrated in FIG. 3, it further being understood that any suitable configuration, such as notched cutouts, can be employed within the scope of the invention. Along these lines, the perspective illustration 62 of FIG. 4 shows an alternate arrangement of a structural member, whereby the lower radiused "rope hem" design with drainage holes of FIG. 3 is removed, in favor of sectioning the lower extending portion of the member 62, after roll forming, and to create individual and welded sections 64, 66, these being separated by a gap 68. It is further understood that the gap 68 (illustrated in exaggerated fashion in FIG. 4) is established by the spacings existing between interior welds 70, between which are formed outwardly protruding beads 72, the further purpose for which being to provide drainage alternative to the same function provided by the drainage holes 60 in FIG. 3. The beads 72 can further be formed into the structural member at any stage, including both before, during, or after roll forming. The cover 12 and reinforcing member 30 are then welded together, as previously described, to complete the assembly.

Figure 5:
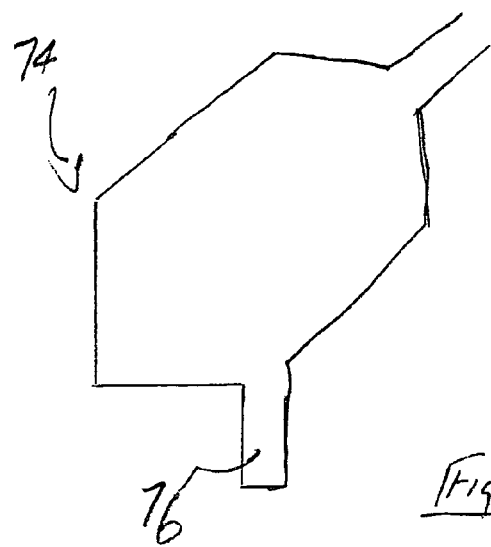
FIG. 5 is a plan view of a further structural member exhibiting an alternately configured flange location according to the present invention.

As previously described, a preferred application of the present assembly is in use as a vehicle rocker panel. It is however again understood that other structural applications are possible with the present structural assembly, such as a fixed and force absorbing barrier. As further shown at 74 in FIG. 5, a further example of a structural member exhibits an alternately configured flange 76, as made possible by the present invention.

It is further understood that features such as ridges, bumps and beads (not shown) may be placed in localized areas associated with the three-dimensional shaped cover and reinforcing member in order to control buckling of the assembly under varying load conditions. By adding localized stiffness, the geometry achieved allows both a reduction in material content associated with the assembly, and also resulting in a decrease in the number of brackets or other spare parts, rendering a lighter and less expensive assembly.

The range of curvilinear and tapered configurations made possible in the geometry of the present assembly, as previously described, further provides vehicle designers with additional flexibility to in the shaping and styling of such structural components.

Having described my invention, other and additional preferred embodiments will become apparent to those skilled in the art to which it pertains, and without deviating from the scope of the present invention.

We claim:

1. A structural assembly, comprising:
a three-dimensional shaped and elongated cover, said cover exhibiting, in cross section, opposite outer and inner facing surfaces along its extending length, and upper and lower extending ends separated by an arcuately extending middle section;
a reinforcing member secured along said inner facing surface of said three-dimensional shaped cover, said reinforcement member including first and second spaced apart wall portions terminating along upper and lower extending ends; and
said lower extending end of said reinforcing member including an integrally formed web interconnecting converging locations of said first and second wall portion, said web exhibiting an open interior defined by a given radius.

2. The structural assembly as described in claim 1, at least one of said cover and said reinforcing member being constructed of a roll formed material.

3. The structural assembly as described in claim 2, further comprising said reinforcing member having a specified shape and size and being roll formed from a single sheet in a closed profile, prior to being cut to length.

4. The structural assembly as described in claim 2, further comprising said reinforcing member having a specified shape and size and being roll formed to achieve a lower strength profile while hardening and subsequently reformed to a final three-dimensional shape.

5. The structural assembly as described in claim 1, further comprising a gap defined between said converging locations of said first and second wall portions during roll forming of said reinforcing member.

6. The structural assembly as described in claim 2, wherein said radially spaced configuration associated with said web creates a spring bias to maintain, in proximate position, said upper ends of said first and second spaced apart wall portions.

7. The structural assembly as described in claim 6, said radially spaced configuration having a specified shape and size and further comprising a substantially bulbous and elongated shape.

8. The structural assembly as described in claim 1, further comprising at least one drainage aperture defined at a lower extending location along said reinforcing member.

9. The structural assembly as described in claim 8, further comprising a plurality of scallop shaped apertures formed into said open interior radius associated with said web.

10. The structural assembly as described in claim 1, said cover and reinforcing member each further exhibiting a specified shape and size, further comprising at least one of welds, adhesives or mechanical fasteners for securing said reinforcing member to said inner extending surface of said elongated and three-dimensional shaped cover.

11. The structural assembly as described in claim 1, said reinforcing member being roll formed from a continuous length of a steel grade material and further comprising a longitudinally extending and recessed portion integrally formed within each of said first and second spaced apart wall portions, said recessed portions exhibiting at least one of a step, bead or ribbed shape for imparting strength to said reinforcing member.

12. A rocker panel assembly incorporated into a vehicle, comprising:
an elongated and three-dimensional shaped rocker panel cover, said rocker panel exhibiting, in cross section, opposite outer and inner facing surfaces along its extending length, and upper and lower extending ends separated by an arcuately extending middle section;
a reinforcing inner member secured along said inner facing surface of said three-dimensional shaped rocker panel cover, said reinforcement member including first and second spaced apart wall portions terminating along upper and lower extending ends;

said lower extending end of said reinforcing member including an integrally formed web interconnecting converging locations of said first and second wall portion, said web exhibiting an open interior defined by a given radius; and a gap defined between said converting locations of said first and second wall portions during a roll forming process associated with said reinforcing member.

13. The rocker panel assembly as described in claim 12, said radially spaced configuration having a specified shape and size and further comprising a substantially bulbous and elongated shape.

14. The rocker panel assembly as described in claim 12, further comprising at least one drainage aperture defined at a lower extending location along said reinforcing member.

15. The rocker panel assembly as described in claim 12, further comprising a plurality of scallop shaped apertures formed into said open interior radius associated with said web.

16. The rocker panel assembly as described in claim 12, said rocker panel cover and reinforcing member each further exhibiting a specified shape and size, further comprising at least one of welds, adhesives or mechanical fasteners for securing said reinforcing member to said inner extending surface of said elongated and three-dimensional shaped cover.

17. The rocker panel assembly as described in claim 12, said reinforcing member being roll formed from a continuous length of a steel grade material and further comprising a longitudinally extending and recessed portion integrally formed within each of said first and second spaced apart wall portions, said recessed portions exhibiting at least one of a step, bead or ribbed shape for imparting strength to said reinforcing member.

* * * * *